United States Patent Office 3,320,755
Patented May 23, 1967

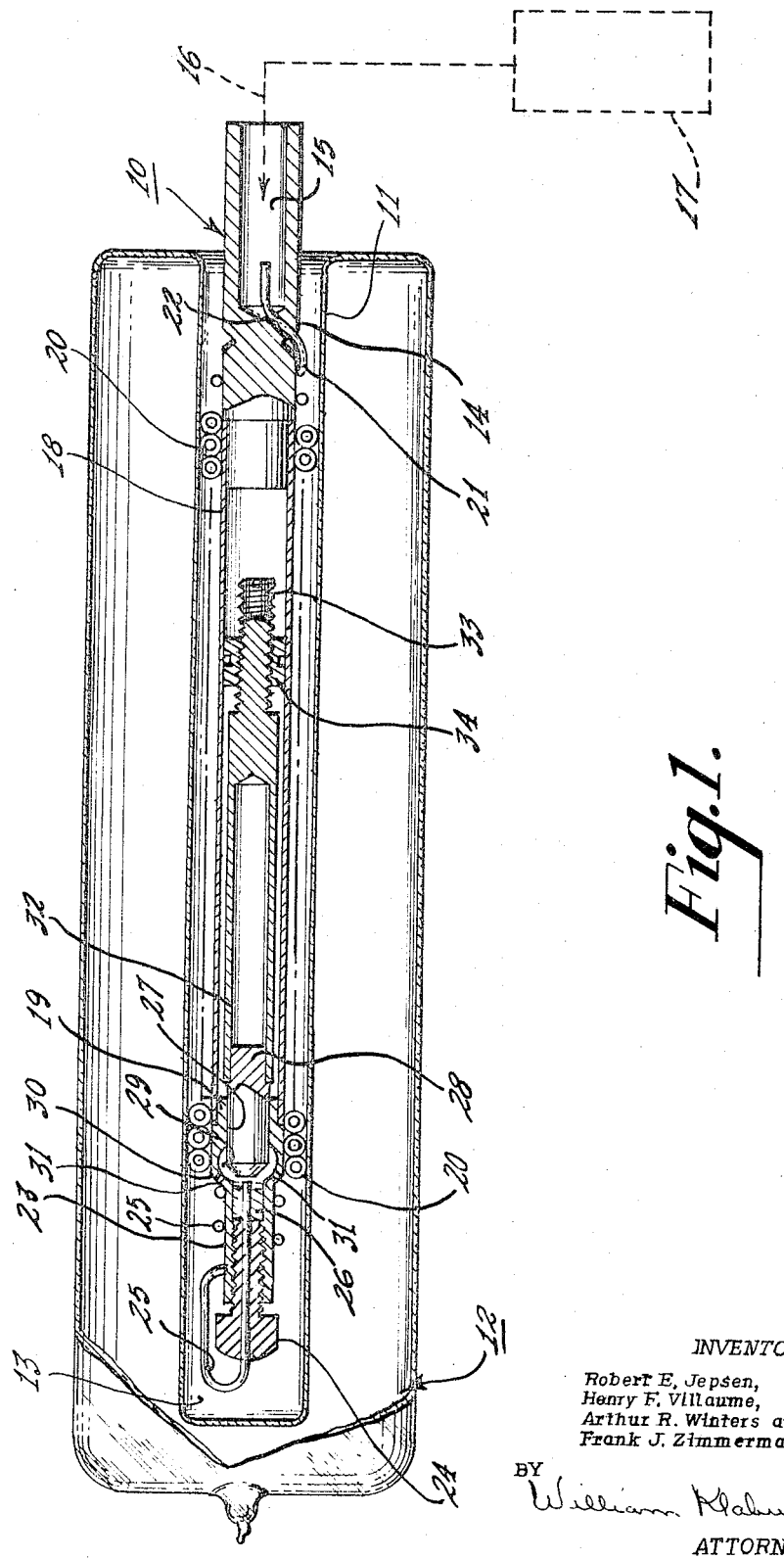

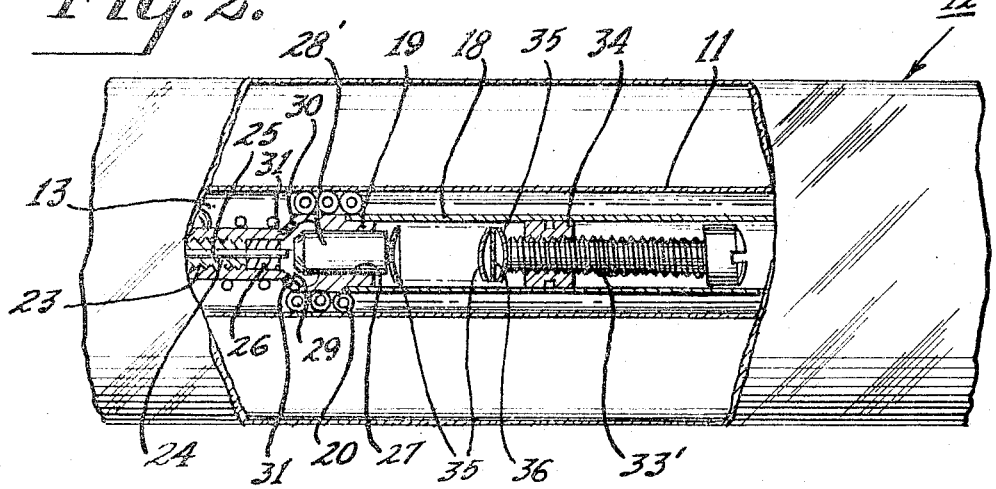
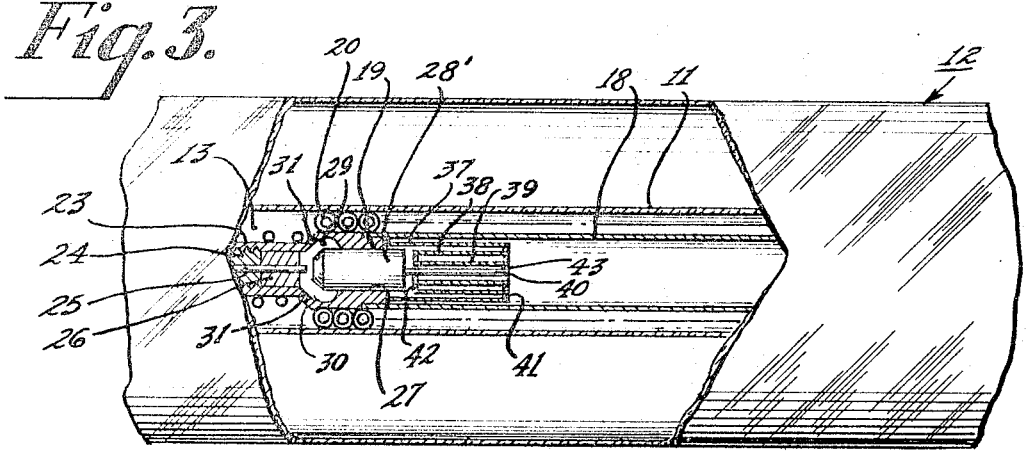

3,320,755
CRYOGENIC REFRIGERATION SYSTEM
Robert E. Jepsen and Henry F. Villaume, Emmaus, Arthur R. Winters, Allentown, and Frank J. Zimmerman, Easton, Pa., assignors to Air Products and Chemicals, Inc., Philadelphia, Pa., a corporation of Delaware
Filed Nov. 8, 1965, Ser. No. 506,730
7 Claims. (Cl. 62—45)

This invention relates to cryogenic refrigeration systems, commonly referred to as cryostats, for extreme low-temperature cooling, and has particular application to those cryogenic refrigeration systems utilizing the well known Joule-Thomson effect or cooling cycle. Such apparatus is especially useful in cryo-electronics systems for both fixed ground-station and airborne operations.

Though not limited thereto, the invention finds ready application to airborne and space travel systems wherein light weight, compactness and high efficiency are primary considerations, and wherein the refrigeration device must be capable of operation in any attitude. One example of such application is in the construction and use of airborne infrared sensing apparatus or detection cells for locating objects and for guiding other objects thereto. Although unit size is not a limiting factor in the application of the invention, the system has the important advantage of lending itself to extreme miniaturization, where necessary.

Refrigeration systems or cryostats operating on the Joule-Thomson cooling effect are well known, but despite their many advantages, they have certain serious inherent problems.

In order to achieve extremely rapid initial cooling of the refrigerant to cryogenic temperatures, the flow rate of the refrigerant from the high pressure source into the expansion chamber through the sized orifice must be high, relative to the flow rate required to maintain cryogenic temperatures. Thus, an orifice sized to effect rapid initial cooling is oversize for the requirement of maintaining a relatively constant low temperature. Therefore, the refrigerant consumed in excess of that required to maintain the low temperature is wasted.

Another problem encountered in the use of fixed orifice devices is that the orifice may become clogged by the presence of minute volumes of gaseous impurities in the refrigerant. These contaminants freeze to block the orifice. While such latter condition is self-correcting in that the temperature rises, once the flow of refrigerant through the cryostat is cut off, thus unfreezing the blocked orifice, it makes for somewhat erratic performance which may be extremely undesirable in the intended use.

The present invention overcomes the above-noted deficiencies by the controlled flow of refrigerant into the expansion chamber in accordance with refrigeration need during rapid cooling to cryogenic temperatures and the reduced need for sustaining the low temperature, thereby conserving refrigerant and making possible longer periods of continuous operation for a given supply of refrigerant.

In accordance with the invention, a cryogenic refrigeration system of relatively light weight and compact design, operating on the Joule-Thomson cooling effect and providing inital refrigerant flow sufficient to effect rapid cooling to cryogenic temperatures followed by decreased refrigerant flow sufficient only to maintain the attained low temperature, is provided by means defining a confined coolant chamber, orifice means for supplying refrigerant to the coolant chamber, means employing the Joule-Thomson cooling effect for introducing the refrigerant to an expansion zone within the coolant chamber, and valve means for throttling the flow of refrigerant into the expansion zone, once the desired low temperature is attained in the coolant chamber, to a level which will merely sustain such low temperature, the throttling of refrigerant flow being controlled in response to differential expansion between structural components of the orifice and valve means as a result of temperature change. The refrigerant is continuously removed from the coolant chamber and may be utilized as an indirect heat exchange medium for precooling the incoming refrigerant.

The expanding stream of refrigerant discharging from the orifice is directed toward an opposed free end of a valve member adapted and arranged for relative movement toward or away from the orifice in response to change in temperature, decreasing temperature causing a narrowing of the gap between valve and orifice. To effect the optimum relative movement between valve and orifice, components thereof are formed of materials having different coefficients of expansion. The selection of construction materials and the size, shape and arrangement of the valve and orifice members are such as to effect relative movement therebetween, resulting from the differential expansion of the components, sufficient to throttle the flow of refrigerant from a pre-set initial rate effective to produce the desired rapid cooling to a subsequent operating rate sufficient only to maintain the refrigerant in the cooling chamber at its attained low temperature.

In the preferred practice of the invention, the orifice is arranged to discharge the refrigerant into the expansion zone of the cooling chamber in a backward, generally axial direction and the valve member is elongated and arranged with its longitudinal axis disposed generally along the axis of the discharging refrigerant stream. At a location remote from the gap between the orifice and the adjacent end surface of the valve, the orifice and valve means are fixed relative to each other, so that differential expansion thereof in response to temperature change causes relative movement between the valve member and the orifice.

The discharge end of the orifice means is supported by the forward end of the mandrel assembly and is adjustably set in a fixed position so that it discharges a stream of refrigerant along the extended axis of the mandrel. A valve body at the forward end of the mandrel contains a small chamber into which the refrigerant is discharged and expanded. The expansion chamber is within and in open communication with the coolant chamber. The rear end portion of the mandrel is a solid member and the remaining forward portion, which at its end supports the valve body, is a hollow tubular extension.

An opening at the rear side of the valve body provides open communication between the expansion chamber and the hollow interior of the mandrel and forms a sleeve or guide to reecive a longitudinally relatively movable valve member in sliding engagement. The valve has a rearward extension which projects into the hollow portion of the mandrel and is fixed at its rear end with respect to the mandrel. The connection between the mandrel and the valve extension is adjustable so that the valve may be moved longitudinally within its guide toward or away from the orifice to provide a desired initial gap between orifice and valve. The initial setting is such as to provide sufficient refrigerant flow to effect rapid cooling.

The tubular mandrel extension and the valve stem extension are formed of preselected materials having appreciably different coefficients of thermal expansion, the material of the valve stem extension having the lowest coefficient. Thus, as the temperature of the unit decreases, the extended mandrel will contract longitudinally to a greater extent than will the extended valve member, thereby narrowing the gap between valve and orifice through which refrigerant is admitted into the expansion chamber and tending to block the flow from the orifice. The differential contraction between the mandrel assembly and the valve assembly assures a change in the gap. For a particular choice of materials having different expansion characteristics, the amount of change in the gap will depend upon the total length of the expandable material between the forward end of the valve member and the point where the far end of the valve extension is fixed with respect to the mandrel. Such length is critical to the attainment of the desired cut-back in gas flow once the temperature in the coolant chamber has been reduced to the required low level.

The expanded, condensed refrigerant flows from the expansion chamber into the bottom or forward end of the receptacle containing the refrigerating unit and is then made to flow in indirect heat exchange relationship with the incoming refrigerant through the annular space containing the heat exchanger coil.

In its broader aspects, the invention may be embodied in other forms of valve and mandrel structure, as will hereinafter appear. In any case, the rate of refrigerant discharge from the coil into the expansion chamber is controlled by the gap between the orifice means at the end of the coil and the valve member which are made to approach or recede from each other in response to temperature change.

In any case, the relative movement between the valve member and the orifice is effected as a result of differential expansion or contraction between two associated elements of the valve assembly having different coefficients of expansion.

For a fuller understanding of the invention reference may be had to the following description and claims taken in connection with the accompanying drawings forming a part of this invention, in which FIGURE 1 is a sectional elevation of one preferred embodiment of the invention, and FIGURES 2, 3 and 4 are fragmentary views in sectional elevation showing modifications of the valve-actuating mechanism.

Referring to FIGURE 1 of the drawings, the refrigeration unit, generally designated by the numeral 10, is inserted within the tubular receptacle portion 11 of a vacuum insulated housing, for example, a vacuum bottle or Dewar flask 12.

The element to be cooled by the refrigeration system is placed inside or outside, but in direct thermal contact with the innermost or forward end of receptacle 11.

The space or coolant chamber 13 is the region of lowest temperature in the entire system.

The refrigeration unit 10 comprises a solid mandrel 14 axially drilled at the rear end to provide a refrigerant inlet chamber 15 into which the refrigerant is introduced through high pressure conduit means from a high-pressure source maintained at ambient temperature. The refrigerant supply conduit means 16 and the source of refrigerant 17 are indicated diagrammatically by dotted lines in FIGURE 1.

The opposite or forward end portion of solid mandrel 14 is reduced so as to receive and be secured to, as by brazing, the end of a hollow tubular mandrel extension 18, the outer surface of which forms an elongated continuation of the mandrel surface.

The forward end of tubular mandrel extension 18 is provided with a hollow valve body 19 of irregular cylindrical configuration. The valve body 19 is reduced at its rear end so as to receive and be secured to the forward end of tubular mandrel extension 18. Along a short mid-portion of its length, the outer surface of the valve body forms a continuation of the mandrel surface. Finned tubing is wound as a helical coil 20 about the extended mandrel, its size being such as to permit the assembled refrigeration unit 10 to fit snugly within the receptacle 11. Coil 20 is extended at each end by sections of plain tubing, that is, tubing without extended surfaces, such as fins. The upstream extension 21 of the coil is wound several times around the mandrel 14 and then passes through a side opening 22 into the gas inlet chamber 15. Extension 21 may terminate inside the chamber 15, or it may be made an integral part of refrigerant supply conduit 16.

Valve body 19 has a reduced portion 23 at its forward end, axially drilled and threaded to receive an adjusting screw 24. Adjusting screw 24 is drilled longitudinally to receive the terminal portion of downstream extension 25 of the heat exchanger coil. Extension 25 is wound several times around reduced portion 23 and is then looped in a reverse bend to pass backward through the central opening in adjusting screw 24. The tubing fits loosely within adjusting screw 24 and has a short plug 26 affixed to its end. The plug fits within the threaded opening of portion 23 and is held in place by the adjusting screw 24. The plug serves to fix the orifice end of the tubing. This end assembly, however, may be firmly fixed and all the desired adujstment may be accomplished from the valve side, as will be described.

Valve body 19 is axially drilled from the rear portion connected to the tubular mandrel extension 18, so as to provide a sleeve guide opening 27 for reception of a short cylindrical valve stem 28 which is free to slide axially within the guide opening. The intermediate portion of valve body 19, between reduced portion 23 and the portion containing sleeve guide opening 27, is internally undercut to provide an expansion chamber 29, into which the end of tubing extension 25 projects slightly to provide a refrigerant inlet to the chamber. The end of the tubing 25, or a terminal portion thereof, forms a discharge nozzle or orifice. The surface portion 30 of valve body 19, between the reduced end portion 23 and the portion of larger diameter containing expansion chamber, is sharply sloped and is drilled at a number of uniformly spaced locations around its circumference, such as four in number, to provide openings 31 for passage of the condensed refrigerant from the expansion chamber 29 into the surrounding coolant chamber 13 at the inner end of receptacle 11. Chamber 13 is aranged and adapted to either contain or to allow to be mounted thereon the material or article to be cooled, not shown.

To obtain the required forward movement of valve stem 28 when the temperature of the unit has been lowered to a level where the initial high rate of refrigerant flow into expansion chamber 29 is no longer needed, the valve stem 28 is provided with a relatively long rear extension 32 which extends axially backward a substantial distance within the tubular mandrel extension 18. The rear end 33 of valve stem extension 32 is reduced and threaded, and is adjustably set in a threaded plug 34 brazed or otherwise secured to the inner wall surface of tubular mandrel extension 18. This provides the alternate means for adjustment of the gap between the orifice and the valve.

Mandrel extension 18 and valve stem extension 32 are formed of materials having substantially different coefficients of expansion, the material of the latter having the lower coefficient. For example, the mandrel extension may be made of stainless steel and the valve stem extension may be made of Invar or similar material having a relatively low coefficient of expansion. The invention, however, is not limited to the use of the foregoing materials of construction.

It is the differential coefficient of expansion between the two materials that provides the desired change in the gap between the end of tubing extension 25. As the temperature of the unit decreases the contraction of tubular mandrel extension 18 is considerably greater than the contraction of valve stem extension 32, with the result that the valve body 19, in which tubular coil extension 25 is fixedly positioned, and the valve stem 28, which is movably supported in the sleeve guide portion 27 of the valve body, have relative longitudinal movement along their common axis. Thus, the threaded plug 26, which is fixed with respect to and forms a juncture between an outer assembly comprising mandrel extension 18, hollow valve body 19, adjusting screw 24, the end portion of tubular extension 25 and plug 26, and an inner assembly comprising valve stem extension 32 and valve stem 28, is the reference point from which relative expansion and contraction is considered. The total relative movement or gap variance that will occur when the refrigeration unit goes from ambient temperature to extremely low cryogenic temperatures will depend upon the distance, measured along the axis of the unit, between plug 34 and the valve gap. The location of plug 34 along the valve stem extension 32 is therefore important, and will depend upon the total amount of movement desired and the expansion characteristics of the materials of construction, as well as temperature considerations. Although valve stem extension 32 has been shown and described as a hollow member, at least along the major portion of its length, it may be a solid body. Also, the valve stem and its extension may be made in one piece.

FIGURE 2 illustrates a modified form of valve assembly. For convenience and simplification the drawing shows only a fragmentary portion of the refrigeration unit, since the associated structure is similar to that shown in FIGURE 1.

In this modification, the valve stem 28' is shorter and not reduced at its rear end, since it is not to be provided with an integral extension, and the threaded plug 34 is joined to the inner wall of mandrel extension 18 at a location somewhat nearer the valve body 19, because the devices for effecting movement of the valve stem are more compactly arranged.

Threaded plug 34 is provided with an adjustable screw 33' which, as with valve stem extension 32 and its associated threaded portion 33, permits the valve to be initially set in any desired gap position, or to be reset, if desired.

Between the rear end of valve stem 28' and the forward end of screw 33' the tubular mandrel extension 18 is internally packed with a bank of dished, bimetallic discs 35 arranged in pairs of oppositely faced members. In order that slight axial misalignment of the discs will not cause one disc to slip inside the rim of its opposite disc, flat spacer discs 36 are placed between the concave sides of the paired discs. Alternatively, discs 35 may be provided with narrow flanges arranged to provide face-to-face contact.

The bimetallic discs 35 and the flat spacer discs 36 are both of a size which will permit their free longitudinal movement within the tubular extension 18 under all temperature conditions normally encountered.

Bimetallic discs 35 comprise two integrally-bonded layers of material having appreciably different coefficients of expansion, the layer having the lower coefficient of expansion being on the convex side of the disc. Thus, as the temperature decreases the concave side will contract more than the convex side, causing the disc to become more curved, that is, more deeply dished. The overall thickness of each assembly of a pair of discs and its intermediate spacer disc therefore increases and causes the bank of discs to expand longitudinally. This expansion movement is transferred to the valve stem, which is caused to penetrate deeper into the valve body 19 and the expansion chamber 29, thereby narrowing the gap between the valve and the end of tubular extension 25. The number of pairs of bimetallic discs 35 and the location of threaded plug 34 along the mandrel extension 18 will at least in part be predetermined in accordance with the degree of throttling required.

FIGURE 3 shows another modification of the valve assembly designed to amplify the longitudinal displacement resulting from expansion and contraction. It is especially applicable to systems which employ a refrigerant having an extremely low boiling point, or in which space, particularly in the longitudinal direction, is at a premium.

An assembly of radially-spaced concentric cylinders composed, alternately, of materials having widely different coefficients of expansion is secured in axial alignment to the rear end of valve body 19. For convenience, three cylinders are shown, an outermost cylinder 37, slightly longer than the others, an intermediate cylinder 38 and an inner cylinder 39. Within the inner cylinder 39 there is a valve stem extension 40 of relatively small diameter which is in axial alignment with valve stem 28' which latter, for convenience of illustration, is of the type shown in FIGURE 2. Valve stem extension 40 may be either integral with or removably joined to valve stem 28', or it may merely engage it in an abutting relationship.

The forward end of cylinder 37 is secured to the rear face of valve body 19. The rear end of cylinder 37 is secured, through spacer ring 41, to the rear end of cylinder 38. The forward end of cylinder 38 is similarly joined, through spacer ring 42, to the forward end of cylinder 39. The rear end of cylinder 39 is joined, through spacer ring 43, to the rear end of valve stem extension 40. The forward end of valve stem extension 40 abuts or is joined to valve stem 28'.

The intermediate cylinder 38 and the central pin 40 are made of material having a lower coefficient of expansion than that of the material from which outer and inner cylinders 37 and 39 are made. Thus, with contraction due to extreme low temperature, the pin 40 pushes the valve stem toward the discharge end or orifice of inlet tubing 25 to decrease the flow of refrigerant of entering the expansion chamber 29.

FIGURE 4 shows still another modification of the valve which, too, may effect considerable saving of space. The illustrated construction is somewhat similar to the embodiments shown in FIGURES 2 and 3 in that the member 28' is retained, with some modification, and the threaded plug 34 and adjusting screw 33' is moved closer to valve body 19. While member 28' is retained, it no longer serves as the movable valve element which actually throttles the flow of refrigerant from the orifice. It serves as a carrier or support for a movable bimetallic valve member 44.

Bimetallic valve member 44 is an elongated flat composite strip having a layer of material of high expansion characteristics on one side and a layer of material of low expansion characteristics on the other. One end of metallic strip 44 is secured centrally to the forward end of member 28', and the strip extends forwardly in a generally axial direction to a location just short of the refrigerant inlet or orifice. The strip is slightly curved so that, at ambient temperature, its tip is a little to one side of the orifice.

The convex curved side of strip 44 is composed of the material having the highest coefficient of expansion, so that, as the temperature decreases the curved strip 44 will tend to straighten, thus moving its tip or free end laterally into the path of the incoming refrigerant. Such arrangement causes the strip to be more nearly straight when the valve is nearest its closed position and the gas velocity is at its highest. In such position the strip is best able to resist fluttering or deflection as a result of high gas velocity and its resultant forces. It is not, however, essential that the bimetallic element be arranged in the position shown. It is required only that the tip of the valve will move to throttle refrigerant flow through the orifice when the temperature is lowered, and that the valve element be so positioned or be of such structural strength as not to be adversely affected by the velocity of the refrigerant stream at any rate of flow.

In operation, the cryogenic refrigeration system of the invention is supplied with cryogenic refrigerant, such as, Freons, nitrogen, argon, hydrogen, helium, neon, etc. at relatively high pressure, in the order of 350–12,000 p.s.i.g., the pressure being dependent upon the refrigerant selected.

At start-up, the refrigerant, for example, nitrogen, flows through the heat exchanger coil 20 and its extension 21 and 25 at elevated pressure, and is passed through the orifice into the expansion chamber 29. As the refrigerant discharges from the orifice end of the coil extension 25, it expands rapidly, with pronounced cooling effect resulting in condensation. The condensed refrigerant flows from expansion chamber 29 through openings 31 into the coolant chamber 13 provided at the forward end of the thermally insulated receptacle 11. The refrigerant then flows backward through the annular space containing the coil 20. The cooled refrigerant flowing around and along the outside of the coil is in indirect heat exchange with the incoming refrigerant and picks up heat from the latter.

The refrigeration unit is thus rapidly and progressively cooled to cryogenic temperatures, for example, below −300° F. when nitrogen is the refrigerant employed. In flowing backward through the heat exchanger, the condensed refrigerant is progressively subjected to heat exchange with the cooler incoming refrigerant which has entered the coil at substantially ambient temperature. The condensed refrigerant returns to the gaseous state somewhere along the return passageway and is discharged from the receptacle to the atmosphere at a temperature close to ambient temperature, for example, about 40° F.

As the unit cools down, the effect of the extreme low temperature on the mandrel and the enclosed valve mechanism is to cause relative movement between the valve and the discharge end of the orifice.

In the FIGURE 1 embodiment, the assembly of structural members supporting the orifice member has a greater contraction than the assembly of members which comprise the valve mechanism, thus bringing the valve and orifice closer together, or narrowing the gap. In the FIGURES 2 and 3 embodiments, the same relative movement is effected, however, the structural arrangement is such that valve mounting members have the greater degree of contraction.

The flow of incoming refrigerant is thus throttled, and the flow of refrigerant out of the receptacle 11 is thereby appreciably diminished, thus conserving gas. By the selection of materials of construction having sufficiently diverse coefficients of expansion, and by proper initial setting and adjustment of the parts by the screw means provided, the flow of refrigerant to waste may be minimized and the consumption of refrigerant may be held at a level just sufficient to maintain the desired low temperature within the coolant chamber.

Obviously many other modifications and variations of the invention as hereinbefore set forth may be made without departing from the spirit and scope thereof, and therefore only such limitations should be imposed as are indicated in the appended claims.

What is claimed is:
1. An automatically self-regulating cryostat comprising:
   (a) means forming an insulated coolant chamber;
   (b) means for supplying a refrigerant to said coolant chamber;
   (c) means forming a Joule-Thomson expansion orifice within said coolant chamber;
   (d) means connecting the refrigerant supply means to said orifice to effect the discharge therefrom and cooling of an expanding stream of refrigerant;
   (e) valve means for controlling the flow of refrigerant through said orifice;
   (f) means for discharging the cooled refrigerant from said coolant chamber; and
   (g) separate mounting means for said orifice means and said valve means, composed of materials having different coefficients of expansion, the arrangement of said orifice and valve means being such that the differential expansion of said separate mounting means with reduction in temperature effects a throttling movement between orifice and valve, whereby the flow of refrigerant into said coolant chamber is automatically controlled as a function of temperature.

2. Apparatus as claimed in claim 1 wherein said means connecting the refrigerant supply means to said orifice includes a first portion of major length for conveying the refrigerant in a first direction and a second portion of minor length for reversing the direction of refrigerant flow prior to discharge from said orifice.

3. The system as claimed in claim 1 wherein said means for supplying a refrigerant to said coolant chamber includes a substantially hollow mandrel surrounded by passage means forming a heat exchanger, said mounting means for said valve means having a major portion extending into the interior of said hollow mandrel.

4. The system as claimed in claim 1 wherein said mounting means for said valve means comprise a plurality of bimetallic members having a composition and configuration such as to move said valve means toward said orifice means and throttle refrigerant flow upon reduction of temperature.

5. The system as claimed in claim 1 wherein said mounting means for said valve means comprise a series of parallel extending elements, alternate elements having lower coefficients of expansion than the intermediate elements and being interconnected to each other and to said valve means such as to move said valve means toward said orifice means and throttle refrigerant flow upon reduction in temperature.

6. The system as claimed in claim 1 wherein the coefficient of expansion of said valve mounting means is lower than that of said orifice mounting means.

7. An automatically self-regulating cryostat comprising:
   (a) means forming an insulated coolant chamber;
   (b) means for supplying a refrigerant to said coolant chamber;
   (c) means forming a Joule-Thomson expansion orifice within said coolant chamber;
   (d) means connecting the refrigerant supply means to said orifice to effect the discharge therefrom and cooling of an expanding stream of refrigerant;
   (e) valve means for controlling the flow of refrigerant through said orifice;
   (f) means for discharging the cooled refrigerant from said coolant chamber; and
   (g) separate mounting means for said orifice means and said valve means, said valve means comprising a bimetallic element having a composition and configuration such as to move into a flow throttling position with respect to said orifice means upon reduction in temperature.

References Cited by the Examiner

UNITED STATES PATENTS

| | | | |
|---|---|---|---|
| 2,398,262 | 4/1946 | Swart | 62—511 |
| 2,418,671 | 4/1947 | Schweller | 62—511 X |
| 2,909,908 | 10/1959 | Pastuhov et al. | 62—514 X |
| 3,055,191 | 9/1962 | Dennis | 62—514 X |
| 3,201,947 | 8/1965 | Post et al. | 62—514 |

LLOYD L. KING, *Primary Examiner.*